United States Patent
Riddle et al.

[11] Patent Number: 6,095,594
[45] Date of Patent: Aug. 1, 2000

[54] EXTERIOR BODY SIDE CLADDING ATTACHMENT FOR A MOTOR VEHICLE AND RELATED METHOD

[75] Inventors: Christopher L. Riddle, Westland; Michael J. Marlow, Livonia; Michael J. Bazydlo, St. Clair Shores, all of Mich.

[73] Assignees: Chrysler Corporation, Auburn Hills, Mich.; Textron Automotive Company Inc., Dover, N.H.

[21] Appl. No.: 09/119,802

[22] Filed: Jul. 21, 1998

[51] Int. Cl.[7] ...................................................... B60R 13/02
[52] U.S. Cl. ............................ 296/191; 296/901; 24/297; 280/770
[58] Field of Search .................................... 296/39.1, 187, 296/191, 199, 36, 29, 901, 71, 146.5; 52/511, 716.5, 716.7, 717.01, 717.05; 280/848, 850, 770; 24/297, 453; 293/128

[56] References Cited

U.S. PATENT DOCUMENTS

| | | |
|---|---|---|
| 2,180,925 | 11/1939 | Dyresen . |
| 2,817,131 | 12/1957 | Seegers . |
| 2,864,472 | 12/1958 | Fernberg . |
| 4,039,215 | 8/1977 | Minhinnick . |
| 4,103,400 | 8/1978 | Munse . |
| 4,115,974 | 9/1978 | Purcell . |
| 4,153,291 | 5/1979 | Conti et al. . |
| 4,363,839 | 12/1982 | Watanabe et al. . |
| 4,388,355 | 6/1983 | Ikemizu . |
| 4,456,957 | 6/1984 | Jackson et al. . |
| 4,629,356 | 12/1986 | Hayashi ................... 403/408.1 |
| 4,715,095 | 12/1987 | Takahashi ................... 24/453 |
| 4,762,437 | 8/1988 | Mitomi ....................... 403/406 |
| 4,869,937 | 9/1989 | Nagata et al. . |
| 4,911,495 | 3/1990 | Haga et al. . |
| 5,186,509 | 2/1993 | Tyves . |
| 5,202,172 | 4/1993 | Graf . |
| 5,322,722 | 6/1994 | Rozenberg ................. 428/40 |
| 5,433,498 | 7/1995 | Ishiwata ................... 296/39.1 |
| 5,448,809 | 9/1995 | Kraus ........................ 24/453 |
| 5,536,540 | 7/1996 | Borys et al. . |
| 5,639,522 | 6/1997 | Maki et al. . |
| 5,667,868 | 9/1997 | Freeman . |
| 5,925,425 | 7/1999 | Nelson ....................... 428/31 |

FOREIGN PATENT DOCUMENTS 1181-928  9/1985  Russian Federation .

*Primary Examiner*—Dennis H. Pedder
*Assistant Examiner*—Mikki D. Murray
*Attorney, Agent, or Firm*—William J. Coughlin

[57] ABSTRACT

An exterior cladding attachment for a motor vehicle includes a main body portion and a plurality of carets integrally formed therewith which extend in an inboard direction. Each of the plurality of carets is adapted to engage an aperture provided in a body side panel of the motor vehicle and is formed to include a base portion and an engagement portion. The engagement portion passes through the associated aperture and has a stop surface for retaining the caret therein. The base portion includes first and second spaced apart sides having a thickness adjacent to the main body portion which is approximately 25% or less than the nominal thickness of the main body portion. To further secure the main body portion to the motor vehicle, the cladding attachment includes an adhesive strip disposed adjacent horizontally extending adjacent a lower edge of the main body portion.

26 Claims, 3 Drawing Sheets

6,095,594

EXTERIOR BODY SIDE CLADDING ATTACHMENT FOR A MOTOR VEHICLE AND RELATED METHOD

BACKGROUND OF THE INVENTION

1. Technical Field

The present invention generally relates to motor vehicles. More particularly, the present invention relates to an exterior body side cladding attachment for a motor vehicle.

2. Discussion

Motor vehicles with common body panels are frequently offered in various trim packages each having a distinct exterior appearance. The exterior appearance of the vehicle is often enhanced through distinct front and rear facie. Complementing body side cladding attachments are also often attached to the vehicle. For example, a base model of the vehicle may be offered without body side cladding attachments, whereas upgraded models may include different body side cladding attachments, among other ornamental and functional features.

A number of techniques are known in the art for attaching ornamental panels such as cladding members to the body of a motor vehicle. For example, loose mechanical fasteners are frequently employed. In other applications, mechanical fasteners are heat staked to the cladding member and adapted to engage apertures provided in the body side panel or other portion of the motor vehicle. It is also known to employ double-sided adhesive tape for at least partially fastening ornamental panels to motor vehicles.

While known techniques for attaching ornamental panels to motor vehicles, including but not limited to those techniques discussed above, have proven to be successful for certain applications, they are all associated with certain disadvantages. In this regard, some known techniques are labor and/or cost intensive. Other known techniques do not securely attach the ornamental panel with the associated motor vehicle and/or do not provide an adequate fit between the ornamental panel and the motor vehicle.

SUMMARY OF THE INVENTION

The general objects of the present invention include eliminating the need for loose fasteners to attach an appearance panel such as a body side cladding attachment to a motor vehicle, streamlining vehicle assembly, and providing an exceptional fit between the appearance panel and the body of the vehicle that is not otherwise achievable with various other known attachment systems. It is a more specific object of the present invention to provide an appearance panel for a motor vehicle which includes a plurality of integrally molded carets which do not cause surface deformations on the appearance side of the cladding member.

In one form, the present invention provides a motor vehicle having a body and an exterior cladding member. The exterior cladding member includes a main body portion and a plurality of integrally molded carets. The body of the vehicle includes a corresponding plurality of slots. Each of the slots is adapted to receive an associated one of the plurality of carets to mount the cladding member to the vehicle. The carets are configured for snapping engagement with the associated slots.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
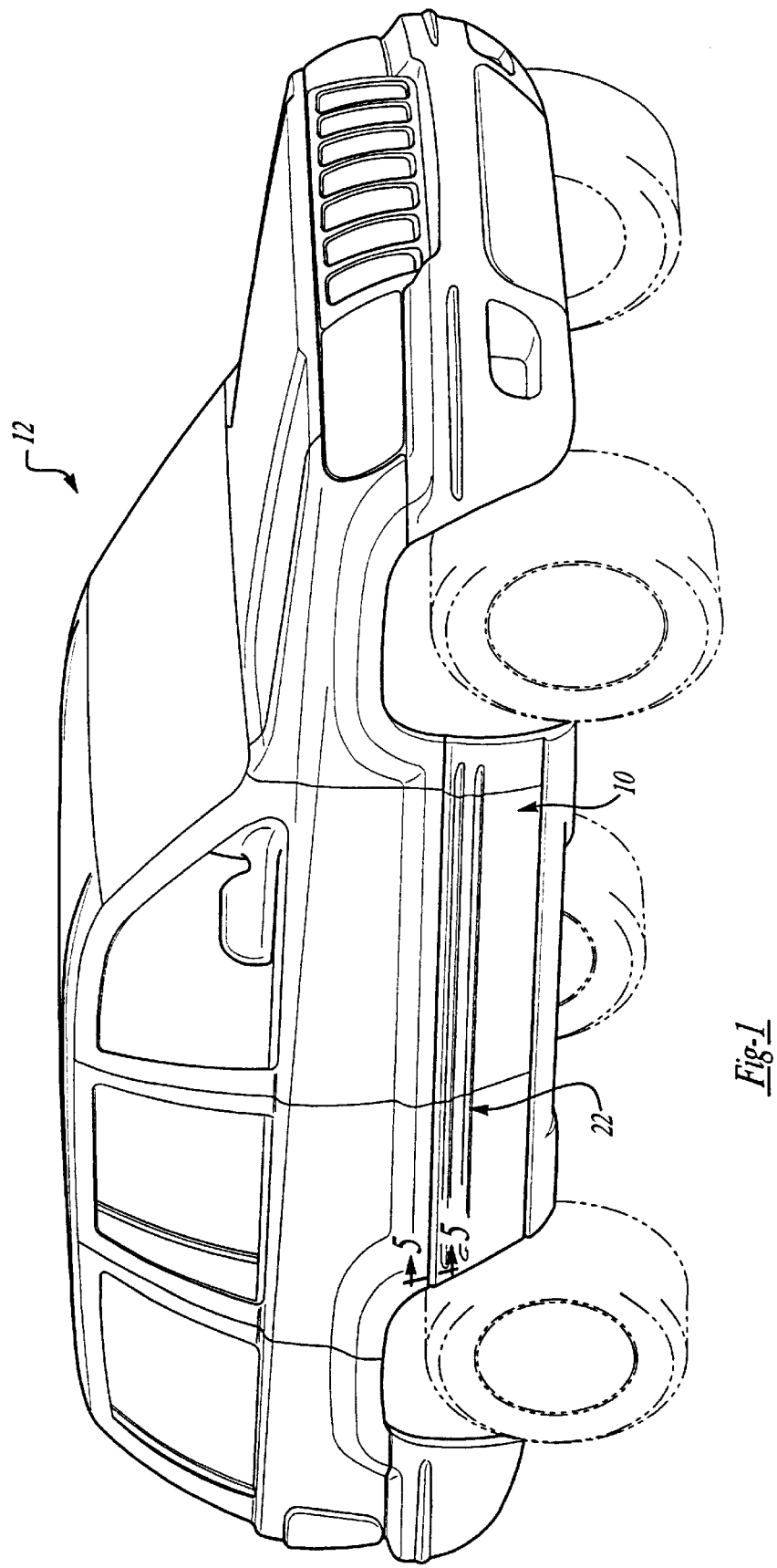
FIG. 1 is an environmental view of an exemplary motor vehicle incorporating an exterior body side cladding attachment constructed in accordance with a preferred embodiment of the present invention.
Figure 2:
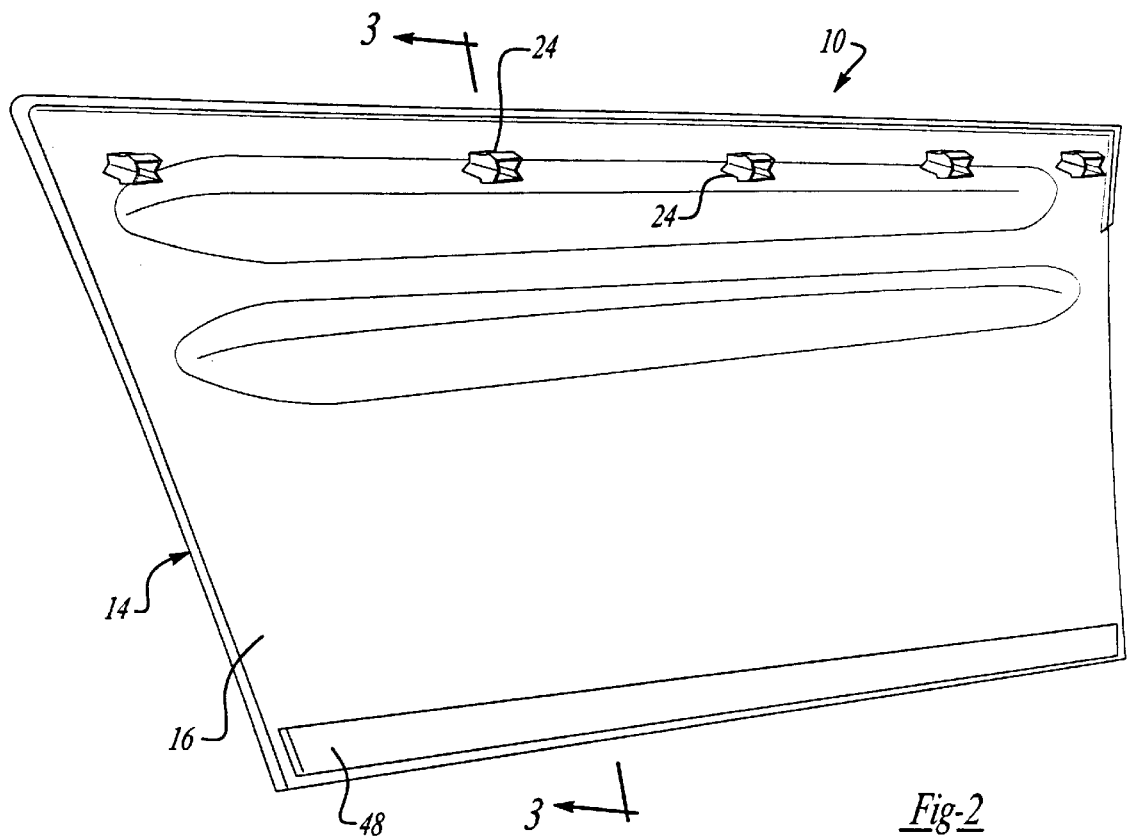
FIG. 2 is an enlarged rear perspective view of the exterior body side cladding attachment of FIG. 1 shown removed from the exemplary vehicle for purposes of illustration.

Turning first to FIG. 1, an appearance panel constructed in accordance with a preferred embodiment of the present invention is identified at reference numeral 10 and illustrated attached to an motor vehicle 12. In the embodiment shown, the appearance panel is illustrated as a body side cladding attachment 10. It will be understood that the particular appearance panel 10 and motor vehicle 12 shown are exemplary and that the teachings of the present invention are not so limited.

With continued reference to FIG. 1 and additional reference to FIGS. 2–5, the body side cladding attachment or cladding attachment 10 is shown to generally include a main body portion 14 having a first side or inboard side 16 and a second side or appearance side 18. The first side is adapted to be positioned adjacent to a body side panel 20 of the motor vehicle 12. The second side 18 is configured to contribute toward a distinct exterior appearance of the motor vehicle 12. In the exemplary embodiment illustrated, the appearance side 18 of the main body portion 14 includes a pair of longitudinally extending ribs 22 (shown specifically in FIG. 1). However, it will be readily appreciated by those skilled in the art that the particular exterior appearance of the main body portion 14 is strictly a matter of design choice and readily subject to modification.

To provide means for securing the cladding attachment 10 to the body of the vehicle 12, the cladding attachment 10 is shown to preferably include a plurality of carets 24 which extend in an inboard direction. In the exemplary embodiment, the carets 24 are horizontally aligned adjacent to an upper edge of the main body portion 14. Additionally, the carets 24 are integrally formed with the main body portion 14. In the embodiment illustrated, the cladding attachment is shown to preferably include five (5) carets. The particular number of carets 24 employed will be understood to be exemplary. Furthermore, it will be understood that the carets 24 can extend from alternate positions on the main body portion 10.

Figure 4:
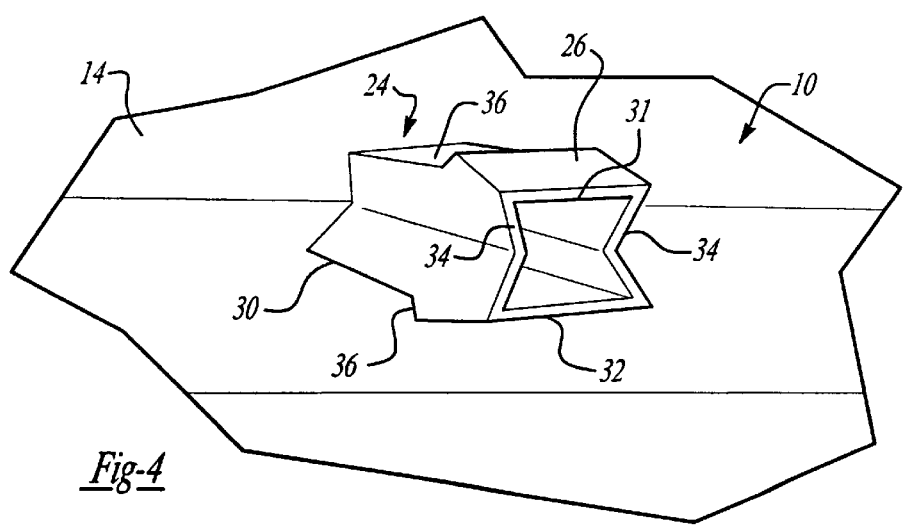
FIG. 4 is an enlarged perspective view of an inboard side of a portion of the body side cladding attachment illustrating in greater detail of one of the injection molded caret for securing the attachment to the motor vehicle.
Figure 3:
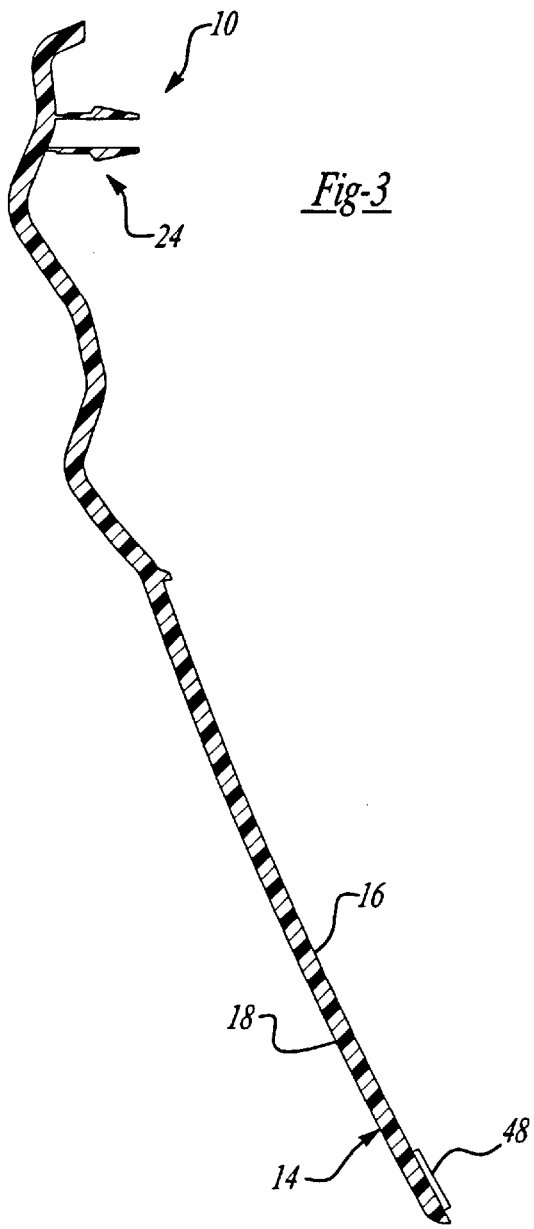
FIG. 3 is a cross-sectional view taken along the line 3-3 of FIG. 1.
Figure 5:
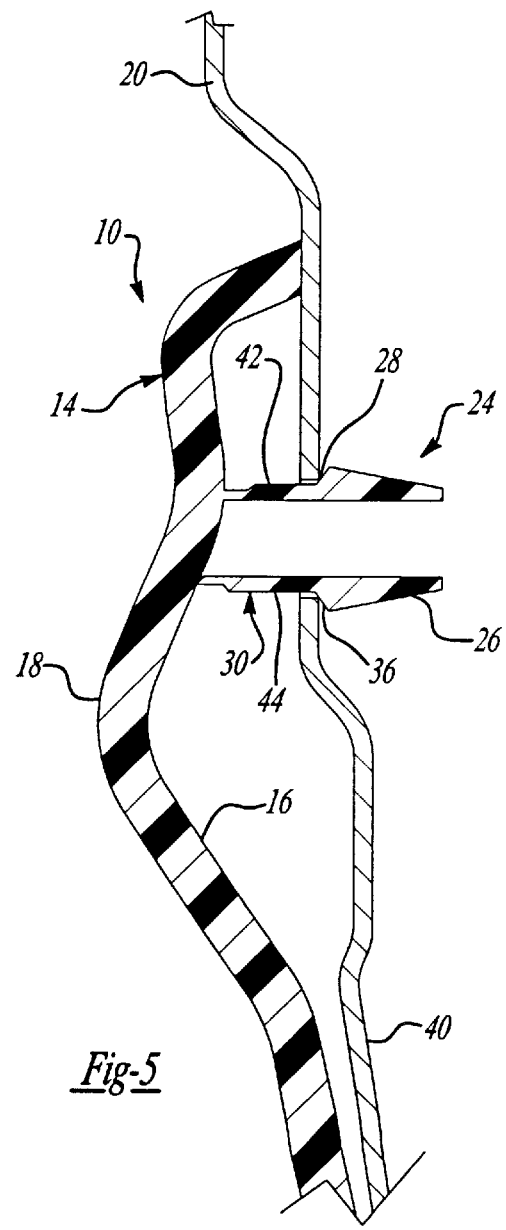
FIG. 5 is a cross-sectional view taken along the line 5-5 of FIG. 1.

With particular reference to the enlarged perspective view of FIG. 4 and the cross-sectional view of FIG. 5, each caret is shown to generally include an engagement portion 26 adapted to pass through an associated slot 28 provided in the body side panel 20 and a base portion 30. The engagement portion 26 includes upper and lower spaced apart sides 31 and 32 interconnected by a pair of V-shaped segments 34. The upper and lower sides 31 and 32 outwardly taper as they extend toward the main body portion 14 to a stop surface 36.

As the engagement portion 24 is inserted into its associated aperture 28 in the body side panel 20, the V-shaped segments 34 compress, thereby bringing the top and bottom sides 31 and 32 closer together. Upon complete insertion, the V-shaped segments 34 resiliently expand and the stop surfaces 36 abut an inner side 40 of the body side panel 20 to prevent removal.

The base portion 30 is shown to similarly include first and second spaced apart sidewalls 42 and 44 interconnected by the V-shaped segments 34 of the engagement portion 24 which are common thereto. In the embodiment illustrated, the first and second spaced apart sidewalls 42 and 44 have a first thickness adjacent the engagement portion 24 and a second thickness adjacent the main body portion 14. The first thickness is substantially greater than the second thickness. In one application, the thickness of the sidewalls 42 and 44 adjacent the main body portion 14 is less than approximately 25% of the nominal thickness of the main body portion 14 and more preferably, approximately 23% of the nominal thickness of the main body portion 14.

In the preferred embodiment, the main body portion and the carets are unitarily formed of plastic through an injection molded process. Heretofore, the injection molding of panels to include integral carets produced surface deformations on the appearance side of the panel opposite the carets. By reducing the thickness of the first and second spaced sides 42 and 44, surface deformations on the exterior side or appearance side 18 of the body side cladding member 10 are substantially eliminated.

To further provide means for attaching the body side attachment 10 to the motor vehicle 12, the body side attachment 10 is shown to include an adhesive strip 48. In the embodiment illustrated, the adhesive strip 48 horizontally extends adjacent a lower edge of the main body portion 14 and serves to secure a lower portion of the main body portion 14 to the vehicle 12.

While the above description constitutes the preferred embodiment of the invention, it will be appreciated that the invention is susceptible to modification, variation, and change without departing from the proper scope or fair meaning of the accompanying claims.

We claim:

1. A vehicle comprising:
   an exterior cladding member including a main body portion and a plurality of integrally molded carets; and
   a body member including a corresponding plurality of slots, each of said slots adapted to receive an associated one of said plurality of carets;
   said plurality of carets being configured for snapping engagement with said corresponding plurality of slots, each caret of said plurality of carets having an engagement portion including first and second spaced apart sidewalls connected by a pair of compressible V-shaped segments, each caret of said plurality of carets being hollow and having an open end.

2. The vehicle of claim 1, wherein said plurality of integrally molded carets are disposed along a common line.

3. The vehicle of claim 1, wherein each integrally molded caret of said plurality of integrally molded carets is disposed adjacent an upper edge of said exterior cladding member.

4. The vehicle of claim 3, further comprising an adhesive strip extending adjacent a lower edge of said exterior cladding member.

5. The vehicle of claim 1, wherein each integrally molded caret of said plurality of integrally molded carets includes an engagement portion passing through said associated slot and a base portion having first and second spaced apart sidewalls, said first and second spaced apart sidewalls each having a first thickness adjacent said engagement portion and a second thickness adjacent said main body portion, said first thickness being substantially greater than said second thickness.

6. The vehicle of claim 1, wherein each integrally molded caret of said plurality of integrally molded carets includes a pair of spaced apart sidewalls, each sidewall having a thickness adjacent said main body portion which is less than approximately 25% of a nominal thickness of said main body portion.

7. The vehicle of claim 6, wherein said thickness is approximately 23% of said nominal thickness of said main body portion.

8. A body side molding attachment for a motor vehicle having a body member with a plurality of slots, the body side molding attachment comprising a main body portion and a plurality of integrally molded carets, each integrally molded caret of said plurality of carets adapted for snapping engagement with an associated one of said plurality of slots, each carat having an engagement portion including first and second spaced apart sidewalls connected by a pair of compressible V-shaped segments, each carat of said plurality of carats being hollow and having an open end.

9. The body side molding attachment of claim 8, wherein said plurality of integrally molded carets are disposed along a common line.

10. The body side molding attachment of claim 8, wherein each integrally molded caret of said plurality of integrally molded carets is disposed adjacent an upper edge of said exterior cladding member.

11. The body side molding attachment of claim 10, further comprising an adhesive strip extending adjacent a lower edge of said exterior cladding member.

12. The body side molding attachment of claim 8, wherein each integrally molded caret of said plurality of integrally molded carets includes an engagement portion passing through said associated slot and a base portion having first and second spaced apart sidewalls, said first and second spaced apart sidewalls each having a first thickness adjacent said engagement portion and a second thickness adjacent said main body portion, said first thickness being substantially greater than said second thickness.

13. The body side molding attachment of claim 8, wherein each integrally molded caret of said plurality of integrally molded carets includes a pair of spaced apart sidewalls, each sidewall having a thickness adjacent said main body portion which is less than approximately 25% of a nominal thickness of said main body portion.

14. The body side molding attachment of claim 13, wherein said thickness is approximately 23% of said nominal thickness of said main body portion.

15. An arrangement for securing an exterior cladding member to a panel of a motor vehicle, the panel having a nominal thickness and a plurality of apertures, the arrangement comprising: a corresponding plurality of engagement members extending from the exterior cladding member, each of said engagement members adapted to be received within an associated one of the plurality of apertures, each of said engagement members being integrally formed with the exterior cladding member, each of said engagement members including first and second spaced apart sidewalls connected by a pair of compressible V-shaped segments, each carat of said plurality of carats being hollow and having an open end.

16. The arrangement for securing an exterior cladding member to a motor vehicle of claim 15, wherein said plurality of engagement members are disposed along a common line.

17. The arrangement for securing an exterior cladding member to a motor vehicle of claim 15, wherein said plurality of engagement members are disposed adjacent an upper edge of the exterior cladding member.

18. The arrangement for securing an exterior cladding member to a motor vehicle of claim 17, further comprising an adhesive strip extending adjacent a lower edge of the exterior cladding member.

19. The arrangement for securing an exterior cladding member to a motor vehicle of claim 15, wherein each sidewall has a thickness adjacent the exterior cladding member which is less than 25% of a nominal thickness of said exterior cladding member.

20. The arrangement for securing an exterior cladding member to a motor vehicle of claim 15, wherein each engagement member includes a distal portion passing through said associated aperture, said first and second spaced apart sidewalls each having a first thickness adjacent said distal portion and a second thickness adjacent the exterior cladding member, said first thickness being greater than said second thickness.

21. The vehicle of claim 1, wherein each carat further includes a base portion having a top side and a bottom side connected by the pair of compressible V-shaped segments, the first and second sides connected to the top and bottom sides through first and second stop surfaces, respectively.

22. The vehicle of claim 21, wherein said first and second sides each taper outwardly as they extend toward the body member.

23. The body side molding attachment of claim 8, wherein each carat further includes a base portion having a top side and a bottom side connected by the pair of compressible V-shaped segments, the first and second sides connected to the top and bottom sides through first and second stop surfaces, respectively.

24. The body side molding attachment of claim 23, wherein said first and second sides each taper outwardly as they extend toward the body member.

25. The arrangement for securing an exterior cladding member to a motor vehicle of claim 15, wherein each carat further includes a base portion having a top side and a bottom side connected by the pair of compressible V-shaped segments, the first and second sides connected to the top and bottom sides through first and second stop surfaces, respectively.

26. The arrangement for securing an exterior cladding member to a motor vehicle of claim 25, wherein said first and second sides each taper outwardly as they extend toward the body member.

* * * * *